A. A. CROZIER.
PNEUMATIC TIRE FOR THE WHEELS OF MOTOR CARS AND OTHER VEHICLES.
APPLICATION FILED MAR. 26, 1917.
1,280,412.
Patented Oct. 1, 1918.
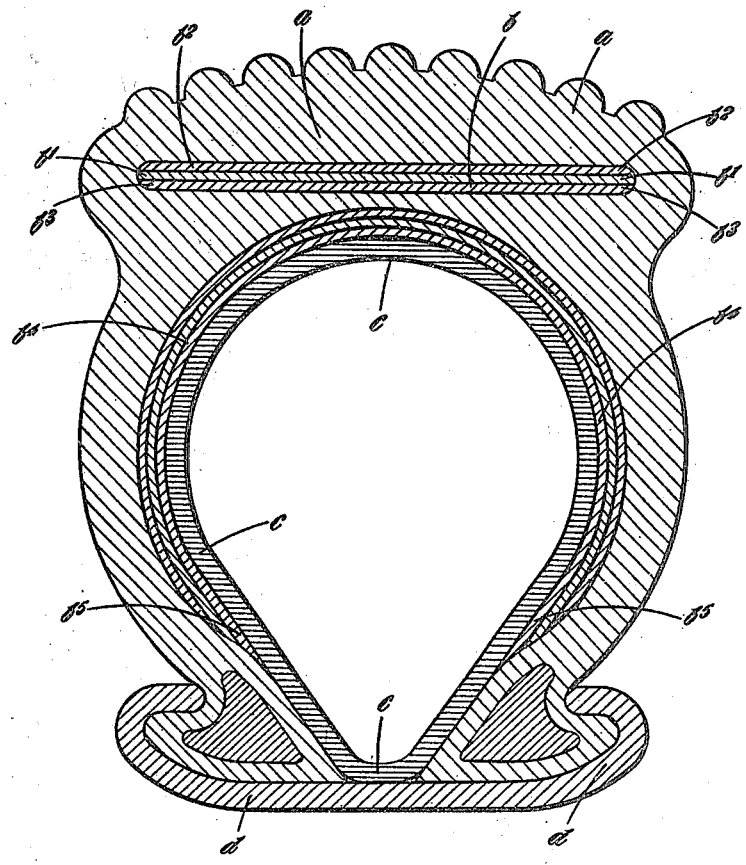
Witnesses.
R. J. Mawhinney.
Edwin J. Beller
Inventor,
Arthur A. Crozier,
by Wilkinson, Giusta & MacKaye.
Attorneys.

UNITED STATES PATENT OFFICE.

ARTHUR ALEXANDER CROZIER, OF LONDON, ENGLAND.

PNEUMATIC TIRE FOR THE WHEELS OF MOTOR-CARS AND OTHER VEHICLES.

1,280,412. Specification of Letters Patent. Patented Oct. 1, 1918.

Application filed March 26, 1917. Serial No. 157,444.

*To all whom it may concern:*

Be it known that I, ARTHUR ALEXANDER CROZIER, of London, England, residing at 3 Woodquest avenue, in the county of London and Kingdom of England, have invented certain new and useful Improvements in or Relating to Pneumatic Tires for the Wheels of Motor-Cars and other Vehicles; and I do hereby declare the following to be a full, clear, and exact description of the invention, such as will enable others skilled in the art to which it appertains to make and use the same.

This invention relates to improvements in pneumatic tires for the wheels of motor cars, motor cabs, motor transport cars, armored motor cars, ambulance cars, motor cycles and other vehicles.

The object of the invention is to provide a pneumatic tire which will not be liable to become punctured or not liable to burst when in use and which will be resilient and cheap to manufacture and far more durable, and give a much greater mileage than the ordinary pneumatic tire.

The invention is illustrated by the accompanying drawings in which:—

Figure 1 represents a transverse section of a type of flat treaded tire which is most suitable for applying the invention.

Fig. 2, represents an enlarged detail section of the laminated band which is located within the substance of the flat tread of the tire and also around the internal surface of the tire.

In carrying the invention into effect I form a tire of caoutchouc of any suitable diameter in cross section having a flattened tread $a$, of any suitable width and form and within the substance of the tread I locate a specially prepared laminated flat band $b$, of any convenient width composed of layers of caoutchouc reinforced with canvas, pure vulcanized caoutchouc without canvas and balata reinforced with canvas, and these different layers may be cemented together by any suitable adhesive or otherwise united so as to form one laminated mass, said layers being preferably arranged one over the other as represented in Fig. 2, so that a layer of pure vulcanized caoutchouc $b'$, without canvas or fabric is between the layer of reinforced caoutchouc $b^2$, and reinforced balata $b^3$, and any number of layers of the different materials $b'$, $b^2$, $b^3$, may be employed in the construction of the laminated band $b$, and each layer may be of any desired thickness whereby the complete laminated band $b$, may be made of any desired thickness in cross section according to the number of layers employed and the thickness of each layer, the dotted lines (Fig. 2), representing the canvas.

Said flat laminated band $b$, may be cemented with any suitable adhesive within an annular cavity formed in the substance of the flattened tread $a$, or it may be vulcanized within the substance of the caoutchouc forming the flattened tread $a$, and will protect the internal compressed air space of the tire or inner tube $c$, from puncture through the tread. I also locate by cementing with any suitable adhesive a laminated band $b^4$ (constructed in the same manner and formed of the same materials as hereinbefore described) entirely around the internal surface of the tire by means of which the sides of the tire will be protected from puncture and the tread of the tire will be additionally protected thereby and will be united in one mass with the exterior parts of the tire which will not be liable to become punctured and will be unaffected by water entering any cuts or punctures made in the caoutchouc or rubber of the outer cover of the tire by sharp obstacles on the road and said specially prepared laminated bands will not rot like canvas, or other fabric employed in the manufacture of pneumatic tires and being extremely strong but at the same time flexible the tire is not liable to burst and the resiliency of the tire is not lessened by the use thereof.

The improved tire may be made as a detachable tire with an inner tube $c$, and connected to the standard type of wheel rim $d$, or it may be made as a single tube tire and connected to the rim of the wheel by any suitable means.

When the improved tire is made as a detachable tire as illustrated, the specially prepared laminated band $b^4$, which entirely surrounds the internal surface should be formed with feather edges or widely beveled edges $b^5$, as it is not necessary to have the laminated band as thick near the rim of the wheel as at the sides and tread of the tire.

What I claim as my invention and desire to secure by Letters Patent is:—

1. A pneumatic tire provided in the tread thereof with an annular flat laminated band of any convenient width composed of layers of caoutchouc reinforced with canvas, pure vulcanized caoutchouc without canvas, and balata reinforced with canvas united to form one laminated mass substantially as described.

2. A pneumatic tire provided in the tread thereof with an annular flat laminated band composed of layers of caoutchouc reinforced with canvas, pure vulcanized caoutchouc without canvas, and balata reinforced with canvas united to form one laminated mass and fitted around the internal surface thereof with a feather edged laminated band of the same materials and constructed in the same manner as the flat band, in the tread thereof, substantially as described.

In testimony whereof, I affix my signature.

ARTHUR ALEXANDER CROZIER.